United States Patent [19]
Honeycutt et al.

[11] Patent Number: 5,985,443
[45] Date of Patent: *Nov. 16, 1999

[54] METHOD OF DISPOSING OF A MOP HEAD

[75] Inventors: Travis W. Honeycutt, Gainesville; Baosheng Lee, Duluth, both of Ga.; James R. Shreffler, Weaverville, N.C.

[73] Assignee: Isolyser Company, Inc., Norcross, Ga.

[ * ] Notice: This patent is subject to a terminal disclaimer.

[21] Appl. No.: 08/969,845

[22] Filed: Nov. 13, 1997

Related U.S. Application Data

[62] Division of application No. 08/647,403, May 9, 1996, Pat. No. 5,707,731.

[51] Int. Cl.$^6$ .............................. D02G 3/00; A47K 7/02
[52] U.S. Cl. ......................... 428/357; 428/394; 15/228; 15/147.1
[58] Field of Search ................. 15/729.1, 147.1, 15/228; 428/394, 357, 364, 365

[56] References Cited

U.S. PATENT DOCUMENTS

| | | | |
|---|---|---|---|
| 2,340,866 | 2/1944 | Dangelmajer | 260/8 |
| 2,395,616 | 2/1946 | Dangelmajer | 260/36 |
| 2,408,377 | 10/1946 | Dangelmajer | 260/36 |
| 2,430,949 | 11/1947 | Porter et al. | 260/36 |
| 2,909,502 | 10/1959 | Matsumoto et al. | 260/45.5 |
| 3,089,493 | 5/1963 | Galindo | 128/283 |
| 3,314,809 | 4/1967 | Klug | 106/197 |
| 3,372,311 | 3/1968 | Lobur | 317/123 |
| 3,413,229 | 11/1968 | Bianco et al. | 252/90 |
| 3,484,874 | 12/1969 | Bickenheuser, Jr. | 4/112 |
| 3,578,619 | 5/1971 | Reeder | 260/22 |
| 3,607,812 | 9/1971 | Takigawa et al. | 260/29 |
| 3,637,657 | 1/1972 | Morti et al. | 260/234 |
| 3,762,454 | 10/1973 | Wilkins, Jr. | 150/1 |
| 3,790,067 | 2/1974 | Scheier | 229/55 |
| 3,859,125 | 1/1975 | Miller et al. | 117/155 |
| 3,865,918 | 2/1975 | Mitchell et al. | 264/188 |
| 3,886,112 | 5/1975 | Watson et al. | 260/33.4 R |
| 3,886,610 | 6/1975 | Sheldon | 5/81 R |
| 3,931,088 | 1/1976 | Sakurada et al. | 260/29.6 RB |
| 4,073,733 | 2/1978 | Yamauchi et al. | 210/500 M |
| 4,079,036 | 3/1978 | Ohmori et al. | 260/45.75 D |
| 4,279,752 | 7/1981 | Sueoka et al. | 210/500.2 |
| 4,295,850 | 10/1981 | Häberli et al. | 8/524 |
| 4,343,133 | 8/1982 | Daniels et al. | 53/431 |
| 4,478,971 | 10/1984 | Ballard | 524/376 |
| 4,620,999 | 11/1986 | Holmes | 428/35 |
| 4,651,725 | 3/1987 | Kifune et al. | 128/156 |
| 4,863,779 | 9/1989 | Daponte | 428/152 |
| 4,952,550 | 8/1990 | Wallach et al. | 502/404 |
| 4,959,341 | 9/1990 | Wallach | 502/404 |
| 4,959,464 | 9/1990 | Yeh | 536/114 |
| 5,051,222 | 9/1991 | Marten et al. | 264/143 |
| 5,106,890 | 4/1992 | Maruhashi et al. | 524/47 |
| 5,181,966 | 1/1993 | Honeycutt et al. | 134/42 |
| 5,181,967 | 1/1993 | Honeycutt | 134/42 |
| 5,183,571 | 2/1993 | Hanel et al. | 210/649 |
| 5,207,837 | 5/1993 | Honeycutt | 134/42 |
| 5,208,104 | 5/1993 | Ueda et al. | 428/364 |
| 5,225,120 | 7/1993 | Graiver et al. | 264/28 |
| 5,252,340 | 10/1993 | Honeycutt | 424/489 |
| 5,470,653 | 11/1995 | Honeycutt et al. | 428/357 |
| 5,707,731 | 1/1998 | Honeycutt et al. | 428/357 |

FOREIGN PATENT DOCUMENTS

| | | |
|---|---|---|
| 47-41741 | 10/1972 | Japan . |
| 60-44897 | 3/1985 | Japan . |
| 63-200764 | 8/1988 | Japan . |
| 2-68396 | 3/1990 | Japan . |
| 90-3085 | 9/1991 | Japan . |
| 743165 | 1/1956 | United Kingdom . |
| 1187690 | 4/1970 | United Kingdom . |
| 1271424 | 4/1972 | United Kingdom . |
| 1312370 | 4/1973 | United Kingdom . |
| 1374199 | 11/1974 | United Kingdom . |
| 1451619 | 10/1976 | United Kingdom . |
| 2083762B | 3/1982 | United Kingdom . |
| 2102461 | 2/1983 | United Kingdom . |
| 2119709 | 11/1983 | United Kingdom . |
| 2211088 | 6/1989 | United Kingdom . |
| 2211196 | 6/1989 | United Kingdom . |
| 2227245 | 7/1990 | United Kingdom . |
| 2248842 | 4/1992 | United Kingdom . |
| 386161 | 1/1993 | United Kingdom . |
| WO80/01374 | 7/1980 | WIPO . |
| WO91/17210 | 11/1991 | WIPO . |

*Primary Examiner*—Newton Edwards
*Attorney, Agent, or Firm*—Needle & Rosenberg, P.C.

[57] ABSTRACT

A mop head made from a plurality of fibers of polyvinyl alcohol that are only water soluble at temperatures above 37° C., where the fibers are formed into a mop head. A disposable cleaning rag made from at least one layer of a plurality of fibers of polyvinyl alcohol that are only water soluble at temperatures above 37° C., wherein the fibers are formed into a disposable cleaning rag.

20 Claims, No Drawings

METHOD OF DISPOSING OF A MOP HEAD

This application is a divisional of U.S. Ser. No. 08/647,403, filed May 9, 1996, issued as U.S. Pat. No. 5,707,731.

BACKGROUND OF THE INVENTION

1. Field of the Invention

The present invention relates to the medical and cleaning product fields. In particular, the present invention provides a disposable article, such as a mop head or a rag, which may be disposed of after use and methods for the use and disposal of the articles.

2. Background

Hospital patient care generates considerable quantities of infectious medical waste in primary and acute care facilities. There has been a general conversion from reusable, cleanable items, to disposable items over the last three decades. These conversions were made to promote antiseptic techniques in patient care and to decrease the potential for cross-infections between patients, staff and the general public. Recent federal and state government regulations such as the Medical Waste Tracking Act of 1988 and OSHA Medical Facility rules have resulted in a substantial increase in medical waste that must be classifed as "infectious."

When a patient is admitted to a hospital, the patient produces approximately 55 pounds of medical waste per day. Approximately 20% of this waste is infectious. The current stated objective of the American Hospital Association and the Centers for Disease Control is to treat medical waste as soon as it is generated. Both organizations recognize that medical waste is primarily an occupational hazard for health care workers and not an environmental problem. The best way to handle infectious medical waste is to disinfect it at the point of generation and dispose of the treated medical waste with minimum on premises handling and storage. The need for an effective way to dispose of medical waste has been highlighted by the amendment made to 29 C.F.R. 1910.1030 which provides for the federal regulation under the Occupational Safety And Health Act, 29 U.S.C. 655, 657 to control bloodborne pathogens. Specifically, the Act calls for the establishment of an exposure control plan, the containment of specimens of blood or other potentially infectious materials and the general tightening of precautionary measures to minimize the spread of disease. A safe and effective way to dispose of hospital waste would greatly facilitate compliance with the above-referenced Act.

As a result, consumption of medical disposable woven or non-woven products has been growing at a rate of approximately 10% a year. In 1988, sales totaled approximately 1.155 Billion Dollars. It is projected that as of the end of 1996, sales of medical disposable non-woven products will have exceeded two and a half billion dollars. In the United States, there are at least 30 million surgical procedures performed each year. After each surgical procedure, it is necessary that the operating theater be disinfected before a new procedure is performed to minimize any exposure the patients may bring to other patients or staff. This is particularly important in light of today's increasingly stringent regulations regarding occupational exposure to blood and bodily fluids.

One of the most basic operations that is performed in the surgical theater as well as in the clinical environment, generally, is the mopping of floors. Fundamentally, cleaning a floor is perhaps one of the most hazardous duties in the hospital because likely infectious material will reside in the floor in the form of spills, splashes, drips or general runoff of potentially hazardous fluids such as blood, bodily liquids and irrigation products which are presently involved in virtually all operating procedures. Currently, floors are cleaned by employing conventional tools such as mops. It is a common practice in today's surgical venues or hospitals' surgical centers that conventional mops are used once and either disposed of via landfill or incineration or are washed, dried, sterilized and reused. It is practically impossible to clean a used mop head to remove all of the pathogens, infectious materials, needles, and other sharp objects that are caught in the interstices of the yarn constituting the mop itself. Cleaning the mop leads to considerable opportunity for additional hazardous exposure to people that are employed to clean the mops after they are used. Furthermore, conventional mops, when disposed of either through landfill or incineration, provide ample opportunity for reinfection.

In addition, the use of hand-held cleaning articles, such as rags presents a similar, if not heightened danger to the person using the rag.

Thus, there exists a need for a suitable cleaning article, such as a mop head or a rag, capable of being disposed of after use while avoiding additional burdens being placed upon landfills and other disposal sites. There is also a need to provide a disposable cleaning article, such as a mop head or a rag, which, after use, can be solubilized and substantially sterilized in a single operation.

SUMMARY OF THE INVENTION

To fulfill these needs, the present invention provides a mop head or cleaning rag comprising a plurality of fibers comprised of polyvinyl alcohol that are only water soluble at temperatures above about 37° C.

In a further embodiment, the present invention provides a mop head or cleaning rag comprising a plurality of fibers comprising crystallized polyvinyl alcohol that is water soluble at temperatures only above about 37° C., wherein the polyvinyl alcohol fibers are produced by dope extrusion and treatment with heat and stretching of a greater than 98% saponified polyvinyl acetate and the degree of polymerization for the fibers is from about 1300 to about 2000.

In yet another embodiment, the present invention provides a mop head or cleaning rag comprising a plurality of fibers comprising crystallized polyvinyl alcohol that is water soluble at temperatures only above about 37° C., an effective amount of an anti-blocking agent, and an effective amount of a wetting agent, wherein the polyvinyl alcohol fibers are produced by dope extrusion and treatment with heat and stretching of a greater than 98% saponified polyvinyl acetate and the degree of polymerization for the fibers is from about 1300 to about 2000.

In another embodiment, the present invention provides a mop head or cleaning rag comprising a plurality of fibers comprising crystallized polyvinyl alcohol that is water soluble at temperatures only above about 37° C., an effective amount of an anti-blocking agent, and an effective amount of a wetting agent.

In a further embodiment, the present invention provides a method of disposing of a mop head or cleaning rag comprised of a plurality of fibers comprised of polyvinyl alcohol that are only water soluble at temperatures above about 37° C., the method comprising contacting the mop head with water having a temperature above about 37° C. for a period of time sufficient to dissolve the mop head in the water.

In yet another embodiment, the present invention provides a disposable cleaning rag comprising at least one layer of a plurality of fibers comprised of polyvinyl alcohol that are only water soluble at temperatures above about 37° C.

Additional advantages of the invention will be set forth in part in the description which follows, and in part will be obvious from the description, or may be learned by practice of the invention. The advantages of the invention will be realized and attained by means of the elements aid combinations particularly pointed out in the appended claims. It is to be understood that both the foregoing general description and the following detailed description are exemplary and explanatory only and are not restrictive of the invention, as claimed.

DETAILED DESCRIPTION OF THE PREFERRED EMBODIMENTS

The present invention may be understood more readily by reference to the following detailed description of preferred embodiments of the invention.

Before the present articles and methods are disclosed and described, it is to be understood that the terminology used herein is for the purpose of describing particular embodiments only and is not intended to be limiting. It must be noted that, as used in the specification and the appended claims, the singular forms "a," "an" and "the" include plural referents unless the context clearly dictates otherwise.

Throughout this application, where publications are referenced, the disclosures of these publications in their entireties are hereby incorporated by reference into this application in order to more fully describe the state of the art to which this invention pertains.

The present invention fulfills these needs by providing a disposable cleaning article, such as a mop head Dr a rag, and its method of disposal after use. The article is made up from a fabric that is comprised of fibers of polyvinyl alcohol which are water soluble at temperatures above approximately about 37° C., preferably above about 50° C., more preferably above about 70° C., and even more preferably above about 90° C. For articles having dissolution temperatures of 70° C. to 90° C. and above, the polyvinyl alcohol fibers are produced by a process of dope extrusion (also referred to as "wet spinning", "solution spinning" or "wet/solution spinning") and then treated with heat and stretching. Alternatively, such articles may be produced by melt spinning or hydrogel spinning followed by heating and stretching. For articles having dissolution temperatures of from about 37° C. to 70° C., the fibers are produced by either melt spinning or hydrogel spinning followed by heating and stretching as described herein. Preferred articles are mop heads and cleaning rags In particular, in one embodiment, the present invention provides a mop head comprising a plurality of fibers comprised of polyvinyl alcohol that are only water soluble at temperatures above about 37° C., wherein the fibers are formed into a mop head. In a further embodiment, the polyvinyl alcohol comprises crystallized polyvinyl alcohol. In yet another embodiment, the fibers are produced by dope extrusion and treatment with heat and stretching. In an alternate embodiment, the fibers are produced by melt extrusion (or "melt spinning") and treatment with heat and stretching. In yet another alternate embodiment, the fibers are produced by hydrogel extrusion (or "hydrogel extrusion") and treatment with heat and stretching.

In a further embodiment, the polyvinyl alcohol is a produced from a greater than 80% saponified polyvinyl acetate. In yet another embodiment, the polyvinyl alcohol is a produced from a greater than 98% saponified polyvinyl acetate. In a further embodiment, the polyvinyl alcohol is a produced from a greater than 99% saponified polyvinyl acetate.

In an alternate embodiment of the mop head, the degree of polymerization of the fibers is from about 300 to about 3000. In a further embodiment, the degree of polymerization of the fibers is from about 700 to about 2000. In yet another further embodiment, the degree of polymerization of the fibers is from about 1300 to about 2000.

Moreover, the present invention provides the mop head as described above wherein the water content of the fibers is maintained at from about 1.5 to about 15.0% by weight.

In a further embodiment, the present invention provides a mop head as described above further comprising from about 0.1 to about 5.0% by weight of an anti-blocking agent. In another embodiment, the present invention provides a mop head as described above wherein the fibers are yarn spun, thermally bonded, chemically bonded, needle punched, wet laid or air laid. In a further embodiment, the fibers form a fabric of from about 15 g/yd$^2$ to about 100 g/yd$^2$ in weight. In yet another embodiment, the fibers form a fabric comprising from about 10 to about 50 layers affixed to one another along the approximate mid-section of the fabric perpendicular to at least one border thereof In a further embodiment, the layers are cut to length on each side of said mid-section. In yet another embodiment, the layers are cut to about 1" in length and from about ¼" to about 1" in width.

In an alternate embodiment, the present invention provides the above-described mop head, further comprising from about 0.1 to about 2.0% by weight of a wetting agent.

In a further embodiment of the mop head, the polyvinyl alcohol has a degree of crystallinity of at least about 0.20. In a further embodiment, the polyvinyl alcohol has a degree of crystallinity of at least about 0.40. In yet a further embodiment, the polyvinyl alcohol has a degree of crystallinity of at least about 0.70. Moreover, in a further embodiment, the polyvinyl alcohol has a degree of orientation of at least about 0.20. In a further embodiment, the polyvinyl alcohol has a degree of orientation of at least about 0.40. In yet a further embodiment, the polyvinyl alcohol has a degree of orientation of at least about 0.50.

In yet a further embodiment of the mop head, the polyvinyl alcohol is only water soluble at temperatures above about 50° C. In another preferable embodiment, the polyvinyl alcohol is only water soluble at temperatures above about 70° C. In a more preferably embodiment, the polyvinyl alcohol is only water soluble at temperatures above about 90° C.

In an alternate embodiment, the present invention provides a mop head comprising a plurality of fibers comprising crystallized polyvinyl alcohol that is water soluble at temperatures only above about 37° C., wherein the fibers are formed into a mop head and wherein the polyvinyl alcohol fibers are produced by dope extrusion and treatment with heat and stretching of a greater than 98% saponified polyvinyl acetate and the degree of polymerization for the fibers is from about 1300 to about 2000.

In yet another embodiment, the present invention provides a mop head comprising a plurality of fibers comprising crystallized polyvinyl alcohol that is water soluble at temperatures only above about 37° C., wherein the fibers are formed into a mop head, an effective amount of an anti-blocking agent, and an effective amount of a wetting agent, wherein the polyvinyl alcohol fibers are produced by dope extrusion and treatment with heat and stretching of a greater than 98% saponified polyvinyl acetate and the degree of polymerization for the fibers is from about 1300 to about 2000.

In a further embodiment, the present invention provides a mop head comprising a plurality of fibers comprising crystallized polyvinyl alcohol that is water soluble at temperatures only above about 37° C., wherein the fibers are formed into a mop head, an effective amount of an anti-blocking agent, and an effective amount of a wetting agent. In an alternate preferred embodiment, the polyvinyl alcohol fibers are produced by dope extrusion and treatment with heat and stretching of a greater than 98% saponified polyvinyl acetate. In yet another alternate embodiment, the degree of polymerization for the fibers is from about 1300 to about 2000. In yet another embodiment, the water content of the fibers is maintained at from about 1.5 to about 15.0% by weight.

In addition, the present invention provides a method of disposing of a mop head comprised of a plurality of fibers comprised of polyvinyl alcohol that are only water soluble at temperatures above about 37° C., the method comprising contacting the mop head with water having a temperature above about 37° C. for a period of time sufficient to dissolve the mop head in the water.

Finally, the present invention also provides a disposable cleaning rag comprising at least one layer of a plurality of fibers comprised of polyvinyl alcohol that are only water soluble at temperatures above about 37° C. It must be emphasized that the degree of crystallinity, degree of orientation, degree of polymerization, water content, dissolution temperature, inclusion of additional ingredients such as wetting or anti-blocking agents, processing steps, disposal steps and all other parameters for the rag, and the fibers that make up the rag, may be the same or may be varied just as with the mop head described above and elsewhere herein.

The fibers may be prepared by wet/solution spinning ("dope extrusion"), melt spinning or hydrogel spinning. The particular process used depends upon the desired dissolution temperature of the polyvinyl alcohol fibers. For instance, producing fibers having dissolution temperature of 70° C. and above is preferably accomplished by using a hydrolyzed polyvinyl acetate with a percentage of hydrolysis of at least about 98% and is preferably accomplished using any of the three processes listed above. Alternatively, producing fibers having dissolution temperatures of from about 37° C. to about 70° C. is preferably accomplished by using a hydrolyzed polyvinyl acetate with a percentage of hydrolysis of at least about 80% to about 98% and is preferably accomplished using the melt spinning or the hydrogel spinning process. In one embodiment, postdrawing and heat annealing may be used to increase the degrees of crystallization and orientation of the polyvinyl alcohol, resulting in an increased dissolution temperature for the end-product polyvinyl alcohol fibers.

Polyvinyl alcohol fibers having a solubilization temperature of about 93° C. are preferred for hot water solubility applications. Such fibers are commercially available (Japan Kurary, "vinylon" product) or may be made using the following process.

In a preferred embodiment, polyvinyl alcohol fibers soluble at from 70° C. to about 93° C. (or higher) are prepared by dope extrusion as follows. Raw polyvinyl alcohol is washed in deionized water several times. The polyvinyl alcohol is then dissolved in hot water of approximately 100° C. to make a polyvinyl alcohol solution of from about 10 to about 25% concentration. The solution is preferably filtered and degassed.

The filtered and degassed solution is pumped through fine holes of a spinneret and into a supersaturated $Na_2SO_4$ solution (Glauber's salt) is at 40° C. to about 50° C. For improving the fiber strength, a suitable stretching treatment is given prior to heat treatment. For instance, the filament can be wet drawn to about 2.4 times its original length in a further supersaturated $Na_2SO_4$ solution. The filament is then dried and drawn again to a total stretching of about 3 times (for solubility closer to 70° C.) to 6 times (for solubility closer to 90° C.) its original length, with heating at from 200 to about 250° C., preferably at about 220° C. At this point, the filaments are cut to length, crimped in a 70° C. supersaturated $Na_2SO_4$ solution and washed in room temperature deionized water. The resulting filament is then further processed in an oiling step where surfactants such as lubricants, antistatic agents and cohesion agents are added. Finally, the fibers are tumble dried, in air, until thoroughly dry. These fibers are then optionally wound for subsequent use in manufacturing the articles of the present invention, including the mop heads and rags.

For the purposes of the present invention, suitable antistatic agents are any known in the art that can be used with polyvinyl alcohol fibers. They include, but are not limited to, a mixture of polyethylene oxide (POE) alkylethersulfate sodium [$RO(CH_2CH_2O)_nSO_3Na$] and alkylphosphate potassium: [$(RO)_2P(O)(OK)$] or [$(RO)P(O)(OK)_2$]. Moreover, for the present invention, suitable cohesion agents are any known in the art that can be used with polyvinyl alcohol fibers and include, but are not limited to, POE Alkylether. Finally, suitable antifriction ("lubricants") agents include any known in the art that can be used with polyvinyl alcohol fibers, such as, but not limited to, glyceryl stearate: $C_{17}H_{35}C(O)OCH_2C(H)(OH)CH_2OH$. Thus, the oiling step can use a finishing agent made from the lubricant, cohesion, and antistatic agents. For example, the agents can be used in an 80% antistatic, 10% antifriction, and 10% cohesion mixture which may be diluted in water to about 50/50. This mixture can then be used to produce an about 0.21% final finishing level.

It should be noted that the water dissolution temperature of polyvinyl alcohol ("PVA") fibers is increased by the heat treatment, so long as the original hydrolyzed polyvinyl acetate possesses a sufficient percentage of hydrolysis. Thus, hot water insolubility of over 90° C. calls for the use of greater than 98% hydrolyzed polyvinyl acetate. However, lower solubility temperatures can be achieved with lower hydrolysis percentages, i.e. closer to 80% hydrolysis as specified elsewhere herein. As such, the polyvinyl alcohol fibers will not dissolve at room temperature but will in water at temperatures higher than 37° C., preferably 70° C., more preferably 80° C., more preferably still 90° C., and even more preferably 93° C.

In an alternate embodiment, polyvinyl alcohol fibers soluble at from 37° C. to about 70° C. are prepared by melt spinning as follows. For melt spinning, the polyvinyl alcohol is mixed with a plasticizer, such as glycerine polyglycol. Then, at a temperature of between about 190 to about 220° C., the mixture is melted, mixed and spun through a spinneret. Heating and stretching occurs as described above for the wet spinning process. The polyvinyl alcohol for this melt spinning process is preferably produced from a 80–98% saponified polyvinyl acetate, so as to ensure solubility of between 37° C. and 70° C.

In a further alternate embodiment, polyvinyl alcohol fibers soluble at from 37° C. to about 70° C. are prepared by hydrogel spinning as follows. For hydrogel spinning, the polyvinyl alcohol is mixed with water. Then, at a temperature of between about 90 to about 100° C., the mixture is melted and spun through a spinneret. Heating and stretching occurs as described above for the wet spinning process. The polyvinyl alcohol for this hydrogel spinning process is preferably produced from a 80–98% saponified polyvinyl acetate, so as to ensure solubility of between 37° C. and 70° C.

The polyvinyl alcohol useful for the present invention is preferably of a crystallized nature. In one embodiment, the degree of crystallinity is at least 0.20, in another embodiment at least 0.25, in another embodiment at least 0.30, in another embodiment at least 0.35, in another embodiment at least 0.40, in another embodiment at least 0.50, in another embodiment at least 0.60, in another embodiment at least 0.70, in another embodiment at least 0.80, in another embodiment at least 0.90, and in another embodiment at least 0.95. In a further embodiment, the degree of orientation for the heated and stretched polyvinyl alcohol fibers is at least 0.20, in another embodiment at least 0.40, in another embodiment at least 0.50, in another embodiment at least 0.60, in another embodiment at least 0.70, in another embodiment at least 0.80, in another embodiment at least 0.90, and in another embodiment at least 0.95. The degree of crystallinity and the degree of orientation are measured by IR spectroscopy. The degree of crystallinity is the ratio of crystalline area to amorphous area. The degree of orientation is the ratio of non-oriented area to oriented.

The water content of polyvinyl alcohol fiber is preferably kept at a value between approximately 1.5 to 15.0% (wt.), preferably 5% (wt.). The polyvinyl alcohol is further characterized as having a degree of polymerization between approximately 300 to 3000, preferably of from 700 to 2,000, more preferably from about 1300 to about 2000, and most preferably about 1700. In an alternate preferred embodiment, to achieve hot water solubility of closer to 70° C., it is desirable to use polyvinyl alcohol characterized as having a degree of polymerization of below about 1000.

In addition, the polyvinyl alcohol is produced from greater than at least about 80%, more preferably at least about 90%, even more preferably at least about 95%, even more preferably at least about 98%, even more preferably 99%, and even more preferably 99.5% or greater saponified polyvinyl acetate.

As noted, in one preferred embodiment, the present invention provides a novel mop head and its method of disposal for use primarily in the medical industry in hospitals, out-patient facilities and home environments. At such facilities, mop heads generally come into contact with human bodily fluids such that disposal and disinfection has become a matter of major concern in light of the lack of biodegradability of prior products and the potential spread of human fluid-borne diseases such as hepatitis B and AIDS. In order to cope with these difficulties, it is proposed that suitable mop heads be composed of fabric produced from fibers comprising polyvinyl alcohol which water soluble at temperatures preferably above 37° C., and more preferably above 50° C. If the mop heads were soluble at significantly lower temperatures (e.g., below 37° C.), inadvertent solubilization would occur in the event that the mop heads were to contact certain fluids near or just above room temperature, such as recently spilled human blood or urine. Polyvinyl alcohol which dissolves only at higher temperatures such as above 37° C., more preferably 50° C., even more preferably above 70° C., and even more preferably above 90° C. prevents inadvertent solubilization and provides a preferable material for practicing the present invention. In fact, it is contemplated that disposal in a hot water bath, such as a washing machine at or near the boiling point of water dedicated solely to solubilizing mop heads or other similar films, fibers and garments, would also be an effective disinfecting media. However, lower temperature disinfecting media are specifically contemplated so long as their temperature is above the dissolution temperature of the polyvinyl alcohol fibers. Two objectives would thus be accomplished, namely, that the polymer would be both disinfected and would also be solubilized for disposal through the sewer system. Not only would this lessen the burden now being imposed upon current landfill sites, but liquid sewer disposal would prove a comparative low cost technique in ridding the user of soiled mop heads.

Conventional mop heads are generally made from cotton or cellulosic fiber. Yarn sizes are generally 1 cotton count to 0.1 cotton count and are generally present in the form of multiple plies, such as 2-ply, 3-ply or 4-ply. A typical cotton count would be 0.7/4-ply yarn. These yarns are bundled together in parallel and formed into a mop head by sewing a binding along the mid-portion of the mop head perpendicular to the threads. Cotton mop heads are generally made from waste fiber, whereas rayon mop heads are generally made from virgin fiber. The typical mop weighs from about 16 to about 24 ounces.

Mop heads of the present invention can be made from fabrics which are in turn created from fibers of polyvinyl alcohol. The fabric, comprised of polyvinyl homopolymer, has been, in one embodiment, crystallized by postdrawing or by heat annealing or by both postdrawing and heat annealing. Preferable for use in the present invention would be a crystallized, greater than 99% saponified polyvinyl acetate. However, as specified elsewhere herein, other degrees of saponification and crystallization may be involved in providing an operable polyvinyl alcohol fiber to suit the desired purpose.

The mop head fabric can be configured from conventional spun yarn. However, it is preferable to process the fiber into a thermal bond, chemical bond, needle punch, wet laid, air laid or other non-woven fabric. Such processing can be accomplished using tools, methods and procedures familiar to those of ordinary skill in the art of textile manufacturing. The preferred weight of fabric for a mop head is between 15 g/yd$^2$ and 100 g/yd$^2$ which has been formed from approximately 10 and 50 layers which are affixed along their midsection of the fabric perpendicular to at least one border thereof either by stapling, sewing or otherwise combining the layers together. The fabric layers can then be cut on each side to within an inch or so of their sewn together midsection to form tendrils that are from ¼" wide to 1" wide. Typically, a 6" wide mop head would have a nominal length of 16" with 30 layers of fabric producing numerous tendrils.

In an alternate embodiment, the polyvinyl alcohol is used to create a cleaning rag suitable for the same hazardous environments as described above. The rag is created from similar fibers as described for the mop head. However, it is contemplated that the rag is formed from a sufficient number of layers of the bonded, non-woven fabric to provide a suitable rag. The layers are bonded or sewn together to form the finished rag.

In a preferred embodiment, the rag is produced from fabric having a weight of between 15 g/yd$^2$ and 200 g/yd$^2$.

Optionally, in a further preferred embodiment, the polyvinyl alcohol can contain from between approximately 0.1 to 5.0% (wt.), most preferably between 2 to 3% (wt.) based upon the weight of the polyvinyl alcohol, of an anti-blocking agent and/or 0.1 to 2.0% (wt.) of wetting agent based upon the weight of the polyvinyl alcohol polymer. Suitable wetting agents and blocking agents are any known in the art that can be used with polyvinyl alcohol fibers. The anti-blocking agent is used to further enhance the usability of polyvinyl alcohol in producing the present mop head or rag. In particular, it is contemplated that the anti-blocking agent reduces hydrogen bonding between adjacent hydroxyl groups on separate fiber bundles. Suitable anti-blocking agents and members include, but are not limited to, silicon dioxide ($SiO_2$) polymer, talc, calcium carbonate and fumed hydrophilic $SiO_2$. Furthermore, it has been found that the incorporation of a wetting agent within the polyvinyl alcohol fiber or fabric is surprisingly useful for maximizing rate of absorbency of the article. Suitable wetting agents include, but are not limited to, fluorocarbons such as those offered by the Minnesota Mining and Manufacturing Co. sold under the trademark FC-171®.

The polymer for use herein is comprised of polyvinyl alcohol with or without acetyl groups, cross-linked or uncross-linked. The polyvinyl alcohol be can be at least "partially" hydrolyzed, i.e., having greater than 80%, preferably greater than 90%, and even more preferably greater than 95%, but less than about 98% hydrolyzed acetyl groups. In a further embodiment, the polyvinyl alcohol can be "fully" hydrolyzed, i.e., has greater than 98%, and most preferably greater than 99% hydrolyzed acetyl groups.

To provide adequate mechanical strength, polyvinyl alcohol fibers should have degree of polymerization of from about 300 to about 3000, preferably of from 700 to 2000, even more preferably from 1300 to 2000 and most preferably of about 1700.

In producing polyvinyl alcohol resins from the saponification of polyvinyl acetate, impurities such as sodium acetate and sodium sulfate may be found in the resin. To provide a superior fiber, such impurities should be kept below ½% (wt.), more preferably below ¼% (wt.) of the polyvinyl alcohol resin. This can be accomplished with a methanol water rinse or extraction.

It is often desirable that the fiber be colored with pigments or dyes such as azo or anthraquinone molecules. Such pigments and dyes should be employed in an amount between approximately 0.5 to 3.0% (wt.) based upon the weight of the polymeric polyvinyl alcohol.

After producing the present mop head or rag according to the above-noted teachings, that is, from polyvinyl alcohol fibers that are soluble in water only above 37° C., the mop heads and rags can be used in various cleaning procedures. Subsequent to use, the mop heads or rags can be disposed of by introduction into a washing machine for from between 5 and 30 minutes at a temperature of above about 37° C. resulting in a subsequent solubilization of the mop head or rag. Preferably, the temperature of the washing machine is above 95° C. for a period of time sufficient to disinfect any potentially harmful pathogens, etc. The solution produced is suitable for disposal in the standard sewer system.

The preferred embodiments of the above-described articles and methods are set forth in the following examples. Other features of the invention will become apparent from the following examples, which are for illustrative purposes only and are not intended as a limitation upon the present invention.

EXAMPLE I

Tests were conducted to compare the absorption characteristics of mop heads produced pursuant to the present invention with conventional mop heads of rayon and cotton. Mop heads of polyvinyl alcohol of one-ply, two-ply and three-ply thermal bond construction as well as chemical bonded fabric were examined. The various mops were weighed dry and were then soaked in a fluid for five minutes and weighed. The mops were then wrung to squeeze out absorbed fluid and then reweighed semi-dry. The weight of fluid loss from squeezing was calculated by subtracting the semi-dry weight from the wet weight and this was divided by the total weight of wet pick-up and multiplied by 100 to achieve a percentage of water being squeezed from the wet mop head. The various mop heads were then subjected to liquid and their ability to reabsorb liquid was measured. As a result, the following data was generated:

| Samples (wt. in gm) | 1 ply | 2 plies | 3 plies | Rayon | Cotton | Chem bond |
|---|---|---|---|---|---|---|
| ABSORB TEST | | | | | | |
| Dry weight (A) | 5.17 | 8.38 | 10.48 | 13.38 | 13.7 | 4.07 |
| Wet weight (B) | 38.11 | 47.78 | 51.8 | 57.46 | 23.2 | 42.43 |
| Wet pick-up (C) = (B) − (A) | 32.94 | 39.41 | 41.32 | 44.08 | 9.5 | 38.36 |
| % Wet pick-up (D) = (C) × 100/(A) | 637 | 470 | 394 | 329 | 70 | 942 |
| Semi-dry wt. after wringing (E) water out | 11.56 | 19.72 | 25.05 | 24.76 | 3.48 | 29.39 |
| (F) = (B) − (E) % of water out (G) = (F) × 100/(C) | 80 | 71 | 64 | 56 | 37 | 76 |
| REABSORBED TEST | | | | | | |
| wet weight (H) | 34.69 | 49.29 | 53.52 | 56.88 | 35.56 | 38.92 |
| Reabsorbed fluid (I) = (H) − (E) | 23.13 | 29.57 | 28.47 | 24.18 | 15.84 | 25.88 |
| % of reabsorbed fluid (J) = (I) × 100/(E) | 200 | 150 | 113 | 74 | 80 | 198 |

From the above data, it is quite apparent that mop heads produced according to the present invention perform favorably when compared to current commercially available products.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A method of disposing of a mop head, the method comprising contacting the mop head with water having a temperature above 37° C. for a period of time sufficient to dissolve the mop head in the water, wherein the mop head is comprised of a plurality of fibers comprised of polyvinyl alcohol that are only water soluble at temperatures above 37° C. before being dissolved.

2. The method of claim 1, wherein the fibers are comprised of polyvinyl alcohol that comprises crystallized polyvinyl alcohol.

3. The method of claim 1, wherein the fibers are produced by dope extrusion and treatment with heat and stretching.

4. The method of claim 1, wherein the fibers are comprised of polyvinyl alcohol that is produced from a greater than 80% saponified polyvinyl acetate.

5. The method of claim 1, wherein the fibers are comprised of polyvinyl alcohol that is produced from a greater than 98% saponified polyvinyl acetate.

6. The method of claim 1, wherein the fibers are comprised of polyvinyl alcohol that is produced from a greater than 99% saponified polyvinyl acetate.

7. The method of claim 1, wherein the fibers have a degree of polymerization from 300 to 3000.

8. The method of claim 1, wherein the fibers have a degree of polymerization from 700 to 2000.

9. The method of claim 1, wherein the fibers have a degree of polymerization from 1300 to 2000.

10. The method of claim 1, wherein the fibers maintain a water content from 1.5 to 15.0% by weight.

11. The method of claim 1, wherein the fibers are yarn spun, thermally bonded, chemically bonded, needle punched, wet laid or air laid.

12. The method of claim 1, wherein the mop head further comprises from 0.1 to 2.0% by weight of a wetting agent.

13. The method of claim 1, wherein the mop head further comprises from 0.1 to 5.0% by weight of an anti-blocking agent.

14. The method of claim 1, wherein the fibers are comprised of polyvinyl alcohol that has a degree of crystallinity of at least 0.20.

15. The method of claim 1, wherein the fibers are comprised of polyvinyl alcohol that has a degree of orientation of at least 0.20.

16. The method of claim 1, wherein the fibers are comprised of polyvinyl alcohol that is only water soluble at temperatures above 50° C.

17. The method of claim 1, wherein the mop head comprises a plurality of fibers comprising crystallized polyvinyl alcohol that is water soluble at temperatures only above 37° C., and wherein a) the polyvinyl alcohol fibers are produced by dope extrusion and treatment with heat and stretching of a greater than 98% saponified polyvinyl acetate; and b) the degree of polymerization for the fibers is from 1300 to 2000.

18. The method of claim 1, wherein the mop head comprises a plurality of fibers comprising crystallized polyvinyl alcohol that is water soluble at temperatures only above 37° C., an effective amount of an anti-blocking agent, and an effective amount of a wetting agent, wherein a) the polyvinyl alcohol fibers are produced by dope extrusion and treatment with heat and stretching of a greater than 98% saponified polyvinyl acetate; and b) the degree of polymerization for the fibers is from 1300 to 2000.

19. The method of claim 1, wherein the fibers form a fabric comprising from 10 to 50 layers affixed to one another along the approximate mid-section of the fabric perpendicular to at least one border thereof.

20. The method of claim 1, wherein the fibers form a fabric of from 15 $g/yd^2$ to 100 $g/yd^2$ in weight.

* * * * *